United States Patent [19]
Terao

[11] Patent Number: 5,254,803
[45] Date of Patent: Oct. 19, 1993

[54] AUTOMATIC MUSICAL PERFORMANCE DEVICE FOR OUTPUTTING NATURAL TONES AND AN ACCURATE SCORE

[75] Inventor: Ken Terao, Iruma, Japan
[73] Assignee: Casio Computer Co., Ltd., Tokyo, Japan
[21] Appl. No.: 885,306
[22] Filed: May 18, 1992
[30] Foreign Application Priority Data
  Jun. 17, 1991 [JP] Japan .................. 3-171764
  Jun. 17, 1991 [JP] Japan .................. 3-171765
[51] Int. Cl.⁵ .................. G09B 15/04; G10H 1/18; G10H 1/46
[52] U.S. Cl. .................. 84/609; 84/615; 84/626; 84/633; 84/478
[58] Field of Search .................. 84/609–614, 84/634–638, 484, DIG. 12, DIG. 22, 615–620, 626–633, 477 R, 478

[56] References Cited
U.S. PATENT DOCUMENTS
  4,982,642  1/1991  Nishikawa et al. .................. 84/484
  5,085,116  2/1992  Nakata et al. .................. 84/609

Primary Examiner—Stanley J. Witkowski
Attorney, Agent, or Firm—Frishauf, Holtz, Goodman & Woodward

[57] ABSTRACT

In an automatic performance device which automatically performs a piece of music composed of note information input externally, note information input on a real time basis is corrected on the basis of beat information of a piece of music input thereafter and the resulting note information is stored. Correction information for converting the corrected note information into the originally input uncorrected note information is also stored for each note information. When the piece of music is performed automatically, a tone is generated on the basis of the corrected note information and the correcting information, but when the piece of music is output as a score, output is made on the basis of the corrected note information. Alternatively, for note information input by a step time inputting process, information is stored on a timing at which each note input thereafter is generated. When the piece of music is performed automatically, a tone is generated on the basis of the note information the generation timing of which is corrected on the basis of the information on the timing of generation of that note, while a score is output, the input note information is used as is. As a result, accurate score output is possible with note information input in the real time inputting process, and an automatic performance that is natural and rich in musicality is achieved with note information input by the step time inputting process.

29 Claims, 17 Drawing Sheets

| SCALE NO. | STEP TIME | GATE TIME | VELOCITY |
|---|---|---|---|
| 60 | 48 | 45 | 64 |
| 62 | 24 | 24 | 64 |
| 64 | 24 | 22 | 64 |
| 65 | 48 | 20 | 60 |
| 67 | 48 | 20 | 50 |

AUTOMATIC MUSICAL PERFORMANCE DEVICE FOR OUTPUTTING NATURAL TONES AND AN ACCURATE SCORE

BACKGROUND OF THE INVENTION

1. Field of the Invention

This invention relates to automatic performance devices which automatically perform a piece of music on the basis of information on a note input thereto.

2. Description of the Related art

An automatic performance device is conventionally proposed which automatically performs a piece of music on the basis of music information input externally thereto.

In such a conventional automatic performance device, two processes are used for inputting information on a piece of music to be performed automatically. First is a real time inputting process and a step time inputting process.

In the real time inputting process, a musical scale and note length which the user inputs by performance using a performance operator such as a keyboard are detected as information on a piece of music to be automatically performed.

In the step time inputting process, inputting operators such as a musical scale inputting key and a note length inputting key are used to thereby sequentially input information on notes constituting a piece of music to be performed automatically.

The music information input and detected by the above method is stored in the order of its musical scale data, note length data, tone generation interval (gate time) data and tone intensity (velocity) data in a memory for each note and is read out from the memory to produce a note tone for automatic performance.

In such a conventional automatic performance device, and especially in an automatic performance device which inputs music information on a real time basis, the user uses a performance operator such as a keyboard to perform a piece of music to be performed automatically to thereby sequentially input music information. The user, however, cannot accurately input the note information, particularly, the note length, constituting the piece of music. If he wants to output a score of a piece of music performed automatically on the basis of such inaccurate note information, the output score itself would be undesirably inaccurate.

For example, if the note length of a quarter note is prescribed as 48, a note having a note length of 48 is a quarter note. Usually, in a score display, the length of a note is determined accurately to some extent even if there is also somewhat of an error involved in the length of the note in the past. For example, even if a note length of 49 or 47 is performed when a note of 48 is to be properly performed, in order to perform a quarter note, the automatic performance device determines that the note length to be performed is a quarter note and can output a scale of a quarter note.

When note information is input actually in the real time inputting process, a human being uses a keyboard or the like to perform a piece of music so that the note length would be 55 or 40 even if he intends to perform a correct quarter note. As just described, there is a great deviation between a predetermined note length and the actually input note length. Thus, note length cannot accurately be determined and a wrong score would be output in the score outputting process.

Since a musical scale, etc., constituting a piece of music to be performed automatically are sequentially input using an input operator such as a musical scale input key or a note length input key in an automatic performance device which uses the step inputting method, information on notes which constitute a piece of music is input accurately and, if a piece of music is to be displayed as a score on the basis of the input note information or to be output for recording purposes, an accurate score will be output.

Since music information stored in a memory is very accurate, however, there is the problem that automatic performance on the basis of the music information would bring about the performance of a piece of music in a mechanical sense, which is unnatural and fails in musicality.

That is, in an actual performance as a piece of music, the tempo is not constant the music itself, and the note length is not necessarily performed only in the length determined for that note. In addition, the tempo and note lengths of the same kind are not constant through the whole music and would sway slightly. Such a sway also changes depending on the performer. This change is expressed as the personality of the performer and is one factor indicative of the musicality of a piece of music. In an automatic performance device using a conventional step inputting process, data on such a sway cannot be input to the device. Notes of the same kind are performed accurately in the same length at all times, but such performance is unnatural and fails in musicality.

As just described above, the conventional automatic performance devices using the real time and step time inputting processes have problems contradictory to each other.

SUMMARY OF THE INVENTION

It is an object of the present invention to provide an automatic performance device which corrects music information input using a real time inputting process so as to be used for a score output, and which is capable of an automatic performance that is natural and rich in musicality.

In one aspect of the present invention, there is provided an automatic performance device comprising note information inputting means for inputting to the device by performance a series of items of note information constituting piece of music information using a performance operator;

note information storage means for sequentially storing the respective items of note information input by the note information inputting means;

beat inputting means for inputting to the device beats of a piece of music input by the note information inputting means;

correction means for correcting the note information stored in the note information storage means on the basis of the beat information input by the beat inputting means and outputting correcting information for converting the corrected note information to uncorrected note information;

storage control means for rewriting the note information corrected by the correction means with the note information stored in the note information storage means, storing the rewritten note information and storing the corrected information for each note in the note information storage means; and tone generation means for generating a tone on the basis of the note information in the note information storage means rewritten by the storage control means and correcting information.

According to this arrangement, since music information input using the real time inputting process is corrected to accurate music information, a score can be output on the basis of the music information. A piece of music performed automatically using this music information is natural and rich in musicality as in the conventional real time inputting process.

It is another object of the present invention to accurately output as a score the music information input using the real time inputting process.

In another aspect of the present invention, there is provided a score outputting device comprising note information inputting means for inputting to the device by performance a series of items of note information constituting piece of music information using a performance operator;

note information storage means for sequentially storing the respective items of note information input by said note information inputting means;

beat inputting means for inputting to the device beats of a piece of music input by the note information inputting means;

correction means for correcting the note information stored in the note information storage means on the basis of the beat information input by said beat inputting means and outputting correcting information for converting the corrected note information to uncorrected note information;

storage control means for rewriting the note information corrected by the correction means with the note information stored in the note information storage means, storing the rewritten note information; and score outputting means for visually outputting score information based on the note information in said note information storage means rewritten by said storage control means.

According to this arrangement, a score can be displayed, recorded and output on the basis of music information input by the real time inputting process as accurately as music information input using the step time inputting process.

It is a further object of the present invention to provide an automatic performance device which is capable of accurately outputting as a score music information input using the real time inputting process, and which produces an automatic performance that is natural and rich in musicality.

In a further aspect of the present invention, there is provided an automatic performance device comprising note information inputting means for inputting to the device by performance a series of items of note information constituting piece of music information using a performance operator;

note information storage means for sequentially storing the respective items of note information input by the note information inputting means;

beat inputting means for inputting to the device beats of a piece of music input by the note information inputting means;

correction means for correcting the note information stored in the note information storage means on the basis of the beat information input by the beat inputting means and outputting correcting information for converting the corrected note information to uncorrected note information;

storage control means for rewriting the note information corrected by the correction means with the note information stored in the note information storage means, storing the rewritten note information and storing the corrected information for each note in the note information storage means;

tone generation means for generating a tone on the basis of the note information in the note information storage means rewritten by the storage control means and correcting information; and score outputting means for visually outputting score information based on the note information in the note information storage means rewritten by said storage control means.

According to this arrangement, accurate score output is achieved even by inaccurate music information input using the real time inputting process, and an automatic performance that is as natural and rich in musicality as in the conventional real time inputting process is achieved.

It is a still further object of the present invention to provide, an automatic performance device which produces an automatic performance that is natural, rich in musicality and that possesses a trace of sway on the basis of music information input using the step time inputting process.

In a still further aspect of the present invention, there is provided an automatic performance device comprising:

note information inputting means for selecting and inputting to the device a series of items of note information constituting a piece of music information from a plurality of items of note information prepared beforehand;

note information storage means for sequentially storing the respective items of note information input by the note information inputting means;

timing inputting means for inputting to the device the generation timings for the respective notes input by the note information inputting means;

timing information storage means for storing the timing information input by the timing inputting means in correspondence to note information input from the note information storage means;

correction means for correcting the note information stored in the note information storage means on the basis of the timing information stored in the timing information storage means; and tone generation means for generating a tone on the basis of the note information corrected by the correction means.

According to this arrangement, an automatic performance natural and rich in musicality is achieved on the basis of the accurate music information input using the step time inputting process as in the real time inputting process.

It is a further object of the present invention to provide an automatic performance device which is capable of accurately outputting as a score the music information input using the step time inputting process and producing an automatic performance natural and rich in musicality and that possesses a trace of sway.

In a further aspect of the present invention, there is provided an automatic performance device comprising:

note information inputting means for selecting and inputting to the device a series of items of note information constituting a piece of music information from a plurality of items of note information prepared beforehand;

note information storage means for sequentially storing the respective items of note information input by the note information inputting means;

timing inputting means for inputting to the device the generation timings for the respective notes input by the note information inputting means;

timing information storage means for storing the timing information input by the timing inputting means in correspondence to note information input from the note information storage means;

correction means for correcting the note information stored in the note information storage means on the basis of the timing information stored in the timing information storage means;

tone generation means for generating a tone on the basis of the note information corrected by the correction means; and score outputting means for visually outputting score information based on the note information stored in the note information storage means.

According to this arrangement, an accurate score output is obtained as in the conventional step time inputting process and the automatically performed music is natural and rich in musicality as in the real time inputting process.

BRIEF DESCRIPTION OF THE DRAWINGS

Other objects and features of the present invention will be easily understood by those skilled in the art from the following description of preferred embodiments of the present invention.

In the drawings.

DETAILED DESCRIPTION OF THE PREFERRED EMBODIMENTS

The present invention will hereinafter be described specifically on the basis of its embodiments.

FIGS. 1–10 show a first embodiment of an automatic performance device according to the present invention.

Figure 1:
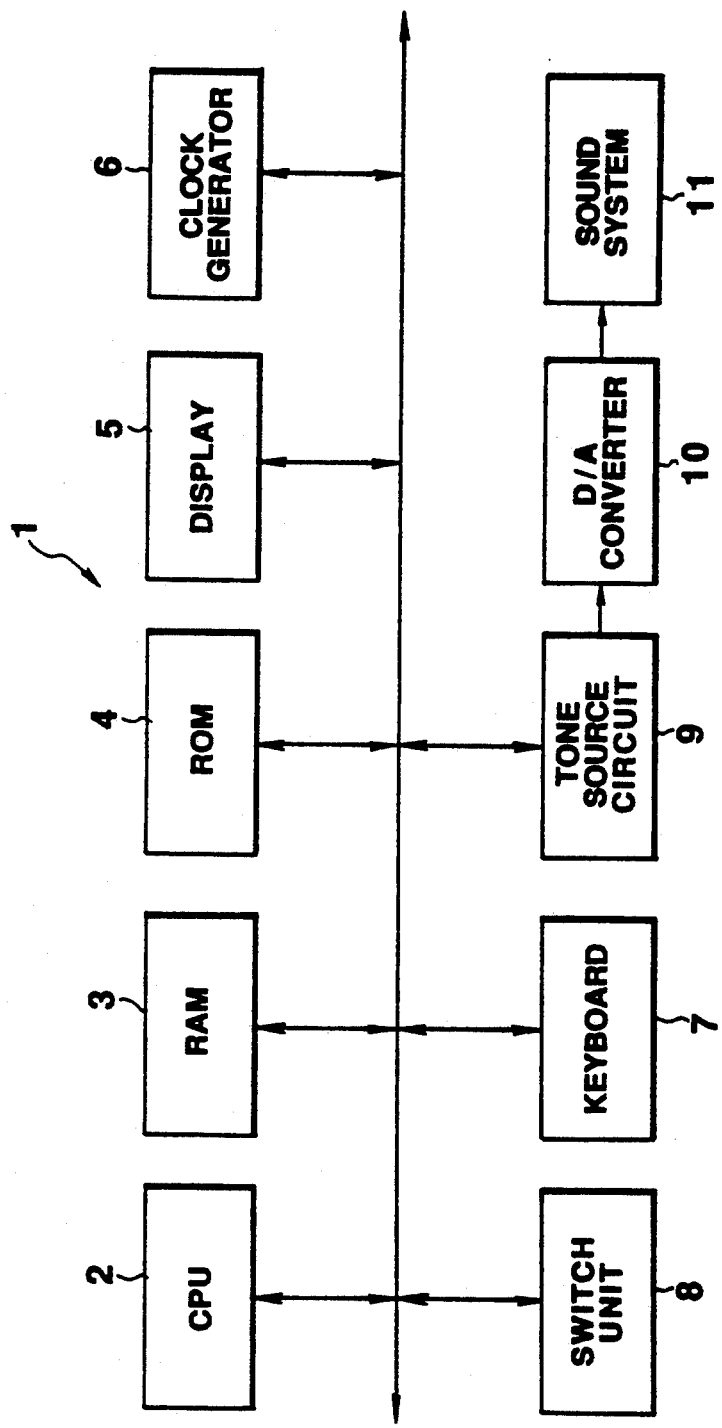
FIG. 1 is a block diagram of an automatic performance device as a first embodiment of the present invention.

FIG. 1 is a block diagram of an automatic performance device 1, which includes a CPU (Central Processing Unit) 2, a RAM (Random Access Memory) 3, a ROM (Read Only Memory) 4, a display 5, a clock generator 6, a keyboard 7, a switch unit 8, a tone source circuit 9, a D/A converter 10 and a sound system 21.

ROM 4 stores various programs and data required for control of automatic performance device 1.

Figure 2:
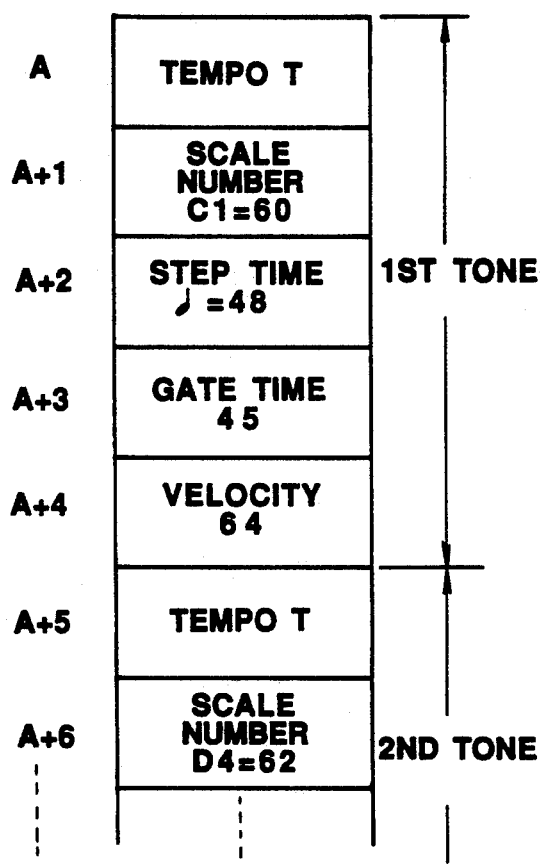
FIG. 2 shows a memory map formed in a RAM.

RAM 3 is used mainly as a work memory. Especially, as shown in FIG. 2, it stores for each note the information on the tempo, note number, step time (note length), gate time (tone generation time), velocity (tone magnitude) of a piece of music to be automatically performed and input through keyboard 7 to be described later in more detail. Data on the stored tempo, step time and gate time is rewritten with the values corrected on the basis of the beat information input through switch unit 8 as beat inputting means to be described later in more detail. Therefore, RAM 3 functions as note information storage means.

CPU 2 controls the respective elements of automatic performance device 1 in accordance with the programs stored in ROM 4 and performs the processing as the automatic performance device, and especially, correction of note information, as will be described later in more detail. Therefore, CPU 2 also functions as correcting means.

Display 5, for example a liquid crystal display, is used to display various information to the user, in particular, a score of a piece of music for automatic performance. Therefore, display 5 functions as score outputting means.

Clock generator 6 includes an oscillator, a frequency divider, etc., and generates different kinds of clock signals Keyboard 7 inputs note information on a piece of music to be performed automatically. Therefore, keyboard 7 functions as a performance operator which performs a series of note information composing music information, and comprises note information inputting means.

Switch unit 8 includes various keys and especially has a beat key (beat inputting means) which inputs beats of a piece of music to be automatically performed.

Tone source circuit 9 generates a tone signal on the basis of tone data incoming from CPU 2 and outputs the tone signal to D/A converter 10, which converts the received digital tone signal to an analog tone signal and outputs it to sound system 11. Sound system 11, for example, includes an amplifier, a speaker, etc., and amplifies the analog tone signal from D/A converter 10 and sounds it as a tone through the speaker or the like. Therefore, tone source circuit 9, D/A converter 10, and sound system 21 comprise tone generation means as a whole.

In operation, first, inputting note information on a piece of music for automatic performance will be described.

To this end, first, a key of switch unit 8 is depressed for setting an input mode.

Note information on the piece of music to be automatically performed is input by using key board 7 to perform the piece of music. The note information thus input includes a note, note length (step time), gate time and velocity and, as shown in FIG. 2, the respective items of information on the notes sequentially input from keyboard 7 are written into RAM 3.

Figures 3, 4:
FIG. 3 shows one example of a score of a piece of music to be performed automatically.
FIG. 4 shows a musical scale number, step time, gate time and velocity of the illustrative score of FIG. 3.

Assume that a piece of music shown in FIG. 3 is performed. If the respective notes are input with accurate note lengths and tone generation times when the step time (note length) of a quarter note is 48, CPU 2 writes the values of the scale number, step time, gate time and velocity shown in FIG. 4 into RAM 3. If note information is input by using keyboard 7 to perform the piece of music, however, the length and tone generation time of each note would not equal a correct note length and tone generation time depending on the personality of a person who performs the piece of music and would sway slightly around the correct note length and tone generation time. As a result, the values actually written into RAM 3 are the length of the note performed while slightly swaying and the step time and gate time as the tone generation interval. The correct note length referred to here is the value which the performer set beforehand for the piece of music, for example, 48 set for a quarter note.

Figure 5:
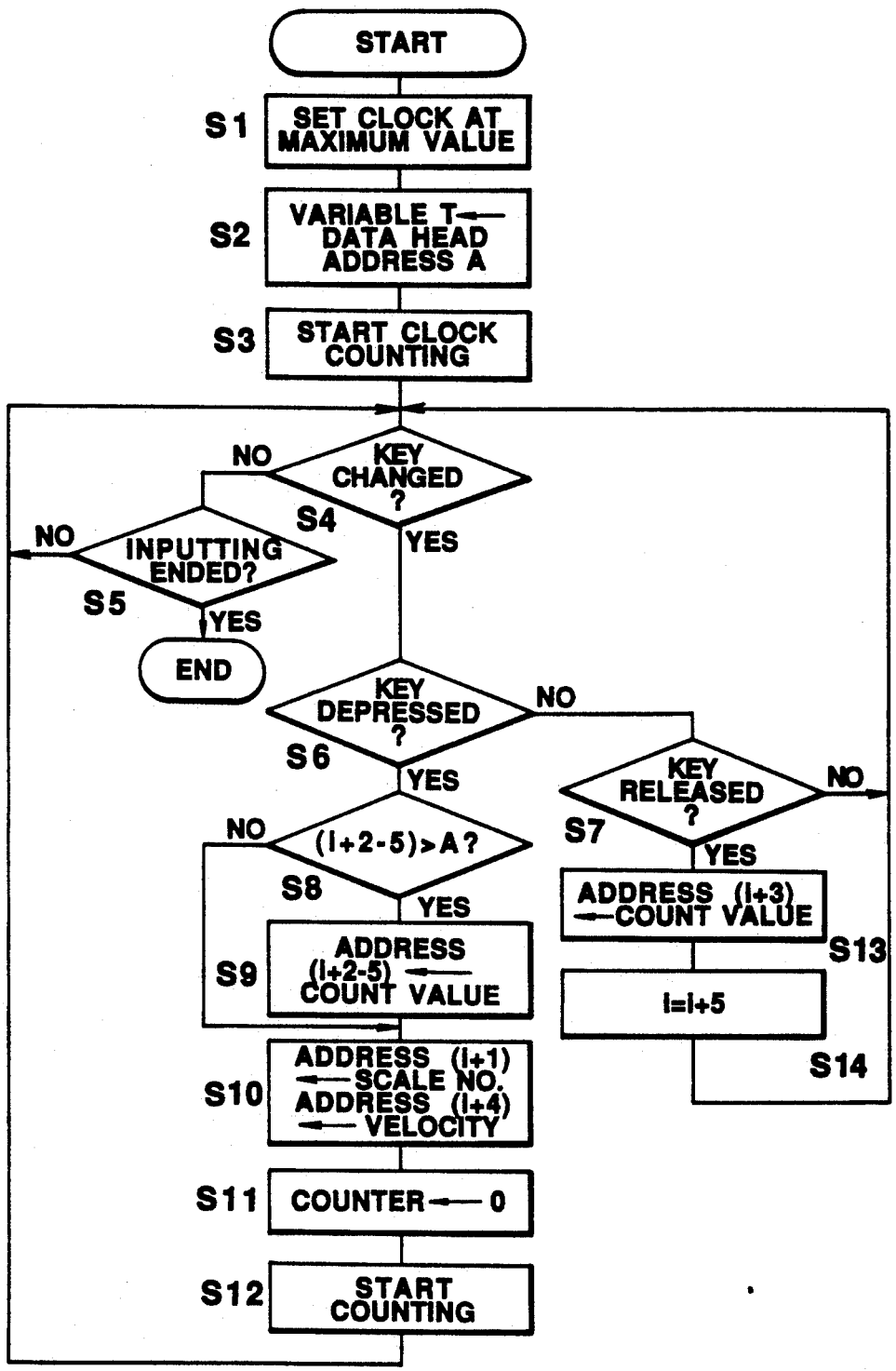
FIG. 5 is a flowchart indicative of a process for inputting a note of a piece of music to be performed automatically.

The note information inputting process will be next described with reference to FIG. 5.

In this process, CPU 2 first sets as a clock a clock having a maximum clock frequency of a plurality of different clocks output from clock generator 6 (step S1), and the head address (data head address) in a note information storage area of RAM 3 as a variable i which designates an address in RAM 3 (step S2). This causes clock pulses to be counted (step S3). Then, the CPU checks whether the status of keyboard 7 has changed (step S4). If not, the CPU checks whether inputting note information has ended (step S5). If not, it returns to step S4 to check whether or not the status of keyboard 7 has changed.

When the status of keyboard 7 has changed, the CPU checks whether a key has been depressed or released (steps S6, S7). Since the key is depressed initially, the CPU passes to step S8 where it checks whether the address (i+2−5) is larger than data head address A (step S8). Initially, since the head address A is set as a variable i, the condition (i+2−5)>A is not satisfied at step S8. Thus, the CPU writes no count value at address (i+2−5) at step S9 and passes to step S10 where the CPU writes a note number corresponding to the depressed key at address (i+1) and the velocity at address (i+4) (step S10).

Next, the CPU sets the counter at 0 (step S11), starts counting (step S12) and returns to step S4.

Similarly, the CPU checks a change in keyboard 7. If there is a change in keyboard 7, the CPU checks whether a key is depressed or released (steps S4, S6, S7). Since the key is depressed now, it is released next time. When the CPU detects a release of the key, it stores the count value at address (i+3) (step S13). This count value shows the time elapsing from the depression of the key to its release, namely, a gate time (tone generation time).

When the CPU terminates writing the count value, it sets (i+5) as variable i, sets variable i at the head of the address of the next tone information, and returns to step S4 where a change in keyboard 7 has occurred (step S14).

When a key is depressed at keyboard 7, the CPU detects this operation at steps S4, S6 and checks whether address (i+2−5) is larger than data head address A (step S8). Since the address is now at the address of a note next to the data head address A, the condition (i+2−5)>A is satisfied. Thus, the CPU writes the count value at address (i+2−5) (step T9). This count value indicates the time duration in which a key at keyboard 7 is being depressed or the step time (note length). When the CPU completes writing the count value into RAM 3, it writes the note number for the depressed key at address (i+1), and the velocity at address (i+4) (step s10). Thereafter, the CPU sets the counter at 0 to cause same to start counts (steps S11, S12). The CPU then returns to step S4 to detect a change in keyboard 7. When the key is then released at keyboard 7, the CPU detects this release of the key at step S7, writes the count value in the counter (gate time) at address (i+3) (step S13), sets variable i indicative of the address at (i+5) and detects the next possible change in keyboard 7.

The CPU performs similar processing for each note to be performed using keyboard 7. When inputting at keyboard 7 at step S5 ends, the note information inputting process ends, at which time, as shown in FIG. 2, the CPU writes data on the note number, step time, gate time and velocity of each input note into RAM 3 using five addresses sequentially, starting with the first tone. The CPU writes no data into a tempo column in the note information inputting process. That is, in automatic performance device 1, a piece of music to be performed automatically is performed in what is called a real time inputting process to thereby input information on each note of the piece of music and write it into RAM 3. Therefore, the CPU writes into RAM 3 note information on a piece of music to be performed automatically in a performed state.

In this way, when the CPU completes writing into RAM 3 all the note information on the piece of music to be performed automatically, the reproduction key at switch unit 8 is depressed to reproduce note information while setting a beat of each note using the beat key at switch unit 8. The CPU writes the value of the beat set thus into the column of tempo T of RA 3 shown in FIG. 2.

The beat setting process will be described next.

Figure 6:
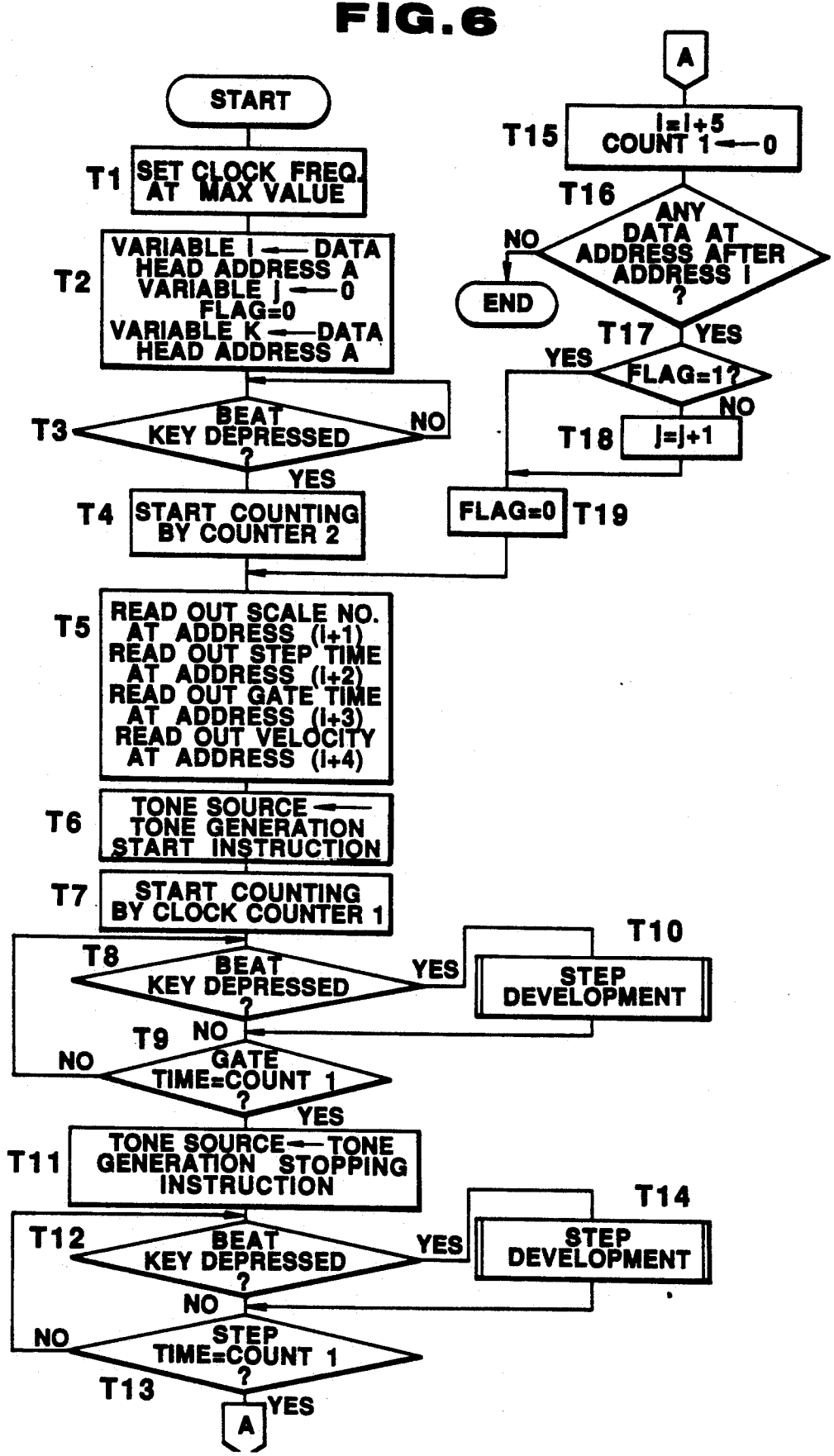
FIG. 6 is a flowchart indicative of a beat setting process.

As shown in FIG. 6, CPU 2 sets a clock having a maximum clock frequency as a clock (step T1), sets variable i at data head address A (the head address in a note information storage area of RAM 3), sets variable j at 0, sets flag at 0, and sets the data head address A in variable k (step T2). Variable i is indicative of a read-out address in RAM 3, and variable j is indicative of the number of notes in a beat. The flag indicates whether the number of notes in a beat is 1 or not. When the number of notes in the beat is two or more, the flag is 0. Variable k is indicative of a write address at RAM 3.

CPU 2 checks whether or not the beat key is depressed (step T3). When the beat key is depressed, the CPU causes counter 2 to start to count (step T4), at which time, the CPU reads out from RAM 3 the scale number at address (i+1), the step time at address (i+2), the gate time at address (i+3) and the velocity at address (i+4) (step T5) and gives tone source circuit an instruction to start tone generation together with the read out note information to thereby cause circuit 9 to do so (step T6), at which time, tone source circuit 9 generates a tone signal for a transferred scale number, and outputs the tone signal through A/D converter 10 to sound system 21 to cause same to sound a tone for the scale number.

Simultaneously with the sounding of this tone, CPU 2 causes clock counter 1 to start to count (step T7), and then checks whether the beat key is depressed or whether clock counter 1 has counted the gate time read out at step T5 (steps T8, T9). Clock counter 1 counts a gate time and a step time. When the beat key is depressed before clock counter 1 counts the gate time, CPU 2 performs a step development process (step T10). When clock counter 1 counts the gate time before the beat key is depressed, CPU 2 instructs tone source circuit 9 to stop tone generation to thereby cause circuit 9 to do so (step T11). Irrespective of the presence or absence of the depression of the beat key, the CPU performs generation of the note only for the gate time (tone generation time) input in the note information input process, at which time the CPU checks whether the beat key is depressed or clock counter 1 has counted the step time (steps T12, T13). When the beat key is depressed, the CPU performs the step development process (step T14).

The step development processes at steps T10 and T14 are the same, and the step development at step T10 or that at step T14 is selected depending on whether the beat key is depressed before or after a lapse of the gate time.

Figure 7:
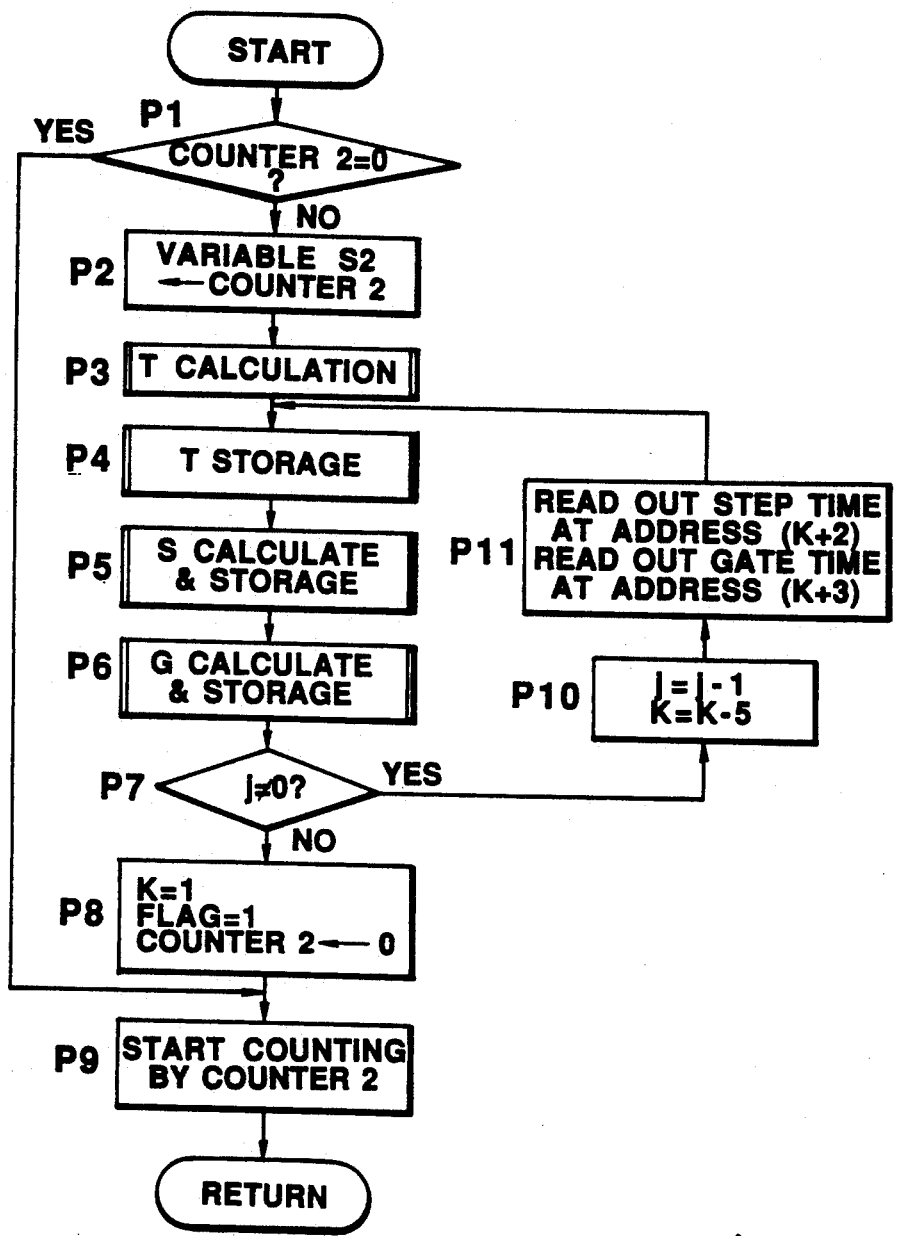
FIG. 7 is a flowchart indicative of a step development process of FIG. 6.

As shown in FIG. 7, this step development process includes a process for performing the calculation and storage of the tempo, step time and gate time.

When the step development starts, first, CPU 2 checks whether counter 2 is 0 or not (step P1). Since the counter 2 is not 0 initially, the CPU passes to step P2 where it sets the count in counter 2 as variable S2 and calculates the tempo T (step P3).

Figure 8:
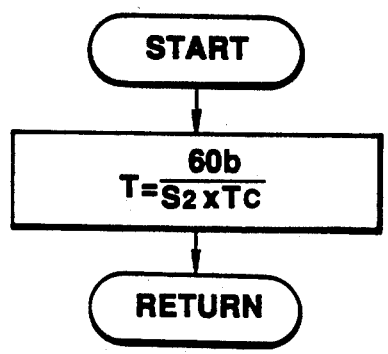
FIG. 8 is a flowchart indicative of tempo calculation in the step development process of FIG. 7.

The calculation of this tempo T is performed in accordance with the equation (1) shown below, as shown in FIG. 8:

$$T = (60 \times b)/(S2 \times Tc) \qquad (1)$$

where b is a constant for setting the number of times of beat key depression within one beat.

Figure 9:
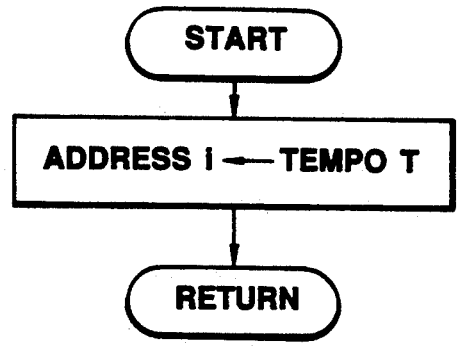
FIG. 9 is a flowchart indicative of tempo storage in the step development process of FIG. 7.

When the CPU completes calculation of tempo T, it stores data on the calculated tempo T in RAM 3 (step P4). As shown in FIG. 9, the storage of data on tempo T includes writing data on the calculated tempo T at address i in RAM 3 and tempo T is used as correction information when automatic performance is made, as will be described in more detail later.

When storage of tempo T ends, the CPU then performs the calculation and storage of data on step time S (step P5).

Figure 10:
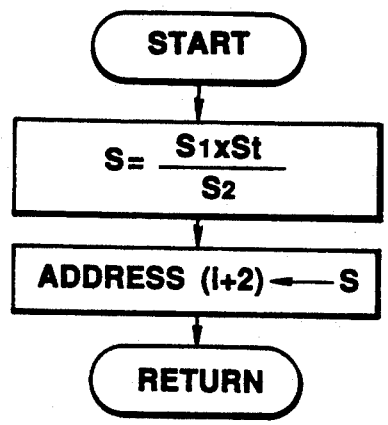
FIG. 10 is a flowchart indicative of a step time calculation and storage in the step development process of FIG. 7.

As shown in FIG. 10, the calculation and storage of data on step time S includes the calculation of the following equation (2) and writing the result of the calculation at address (i+2) in RAM 3:

$$S = (S1 \times St)/S2 \qquad (2)$$

When the calculation and storage of data on step time S ends, the CPU performs the calculation and storage of data on gate time G (step P6).

Figure 11:
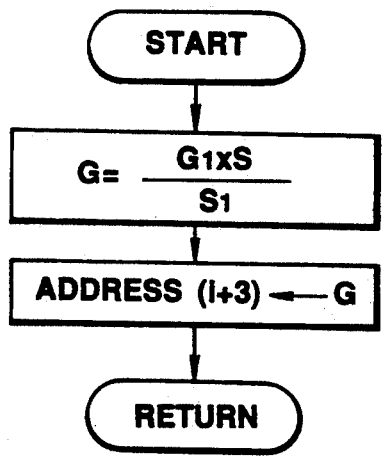
FIG. 11 is a flowchart indicative of gate time calculation and storage in the step development process of FIG. 7.

As shown in FIG. 11, the calculation and storage of data on gate time G includes the calculation of the gate time in accordance with the equation (3) below and writing the result of the calculation at address (i+3) in RAM 3:

$$G = (G1 \times S)/S1 \qquad (3)$$

When the calculation and storage of data on gate time G ends, the CPU checks whether variable j indicative of the number of notes in the beat is 0 or not (step P7). Since, initially, variable j is set at 0 at step T2 of FIG. 6, the CPU sets variable t at 1, the flag at 1, and counter 2 at 0 to thereby cause counter 2 to start its counting operation and hence terminate the step processing (steps P8, P9).

When the first step development process ends, the CPU returns to the beat setting process of FIG. 6. When the gate time and step time have elapsed, the CPU increments variable i by 5 to (i+5) and then checks whether there is any data at an address after address i (steps T15, T16). Since the CPU is now processing the first data, and if there is data at an address after address i, the CPU checks whether the flag is 1 or not (step T17). Since the beat key has been depressed now to thereby have performed the step development, the flag is set at 1 at step P8 of FIG. 7. Therefore, the CPU does not increment variable j, but sets the flag at 0, and passes to step T5 where it reads out note information similarly at the next address, performs tone generation and causes clock counter 1 to start to count (steps T5, T6, T7).

While the CPU is performing tone generation, it checks whether the beat key has been depressed and whether the gate time and step time have passed (steps T8, T9, T12, T13). Now assume that there are two eighth notes in one beat as shown in FIG. 3. In this case, the gate time elapses and tone generation is stopped with no beat key being depressed. Furthermore, the step time elapses and the CPU passes to step T15 without performing step development. The CPU increments the address by 5 at step T15 and checks whether there is data at an address after address i at step T16. Since there is an eighth note in FIG. 3, the CPU checks whether the flag is 1 (step T17). Since the flag is set at 0 at step T19 of the previous processing, the CPU increments variable j by 1 at step T18 and sets the flag at 0 at Step T19.

When the CPU completes the setting of the flag, it passes to step T5 where it reads out the next note information and performs tone generation similarly, while checking the beat key and a lapse of the step time and gate time (steps T8, T9, T12, T13). When the gate time has elapsed, the CPU stops tone generation. When the beat key is depressed, the CPU performs the step development as shown in FIGS. 7-11.

In the step development, the CPU performs the calculation and storage of data on the step time S and gate time G similarly. Since there are now two notes in one beat, first, the CPU performs the calculation of the first tempo and storage of its data, the calculation of step time and storage of its data, and the calculation of gate time and storage of its data for the second note in the beat. Even if this processing of the second note ends, there are two notes in the beat and variable j is incremented at step P18 of FIG. 6, so that variable j is not 0 at step P7 of FIG. 7. Therefore, the CPU passes to step P10 to decrement variable j by one and variable k by 5 and reads out the step time at address (k+2) and the gate time at address (k+3) (step P11). These step time and gate time are for the first note in the beat, and the CPU performs storage of data on tempo T, calculation and storage of data on step time S and gate time G for that note (steps P4, P5, P6). When the CPU performs the storage of data on tempo T, and calculation and storage of data on step time S and gate time G for all the notes in one beat, it sets variable k at 1, the flag at 1 and counter 2 at 0 (step P8) since variable j is 0 at step P7. Thus, the CPU causes counter 2 to start to count (step P9), and returns to the beat setting of FIG. 6. When there are three or more notes in one beat, the CPU performs the step development by the number of notes.

When the CPU performs the above processing sequentially for the respective items of note information written in RAM 3, there are no longer data at addresses after address i at step 16 of FIG. 6 to thereby complete the beat setting process.

The beat setting process corrects each note so as to fall within a range of errors in which that note is accurately detectable when the CPU outputs as a score the note information on a piece of music for automatic performance that is input using the real time inputting process, and performs the following processing eventually.

Figure 12:
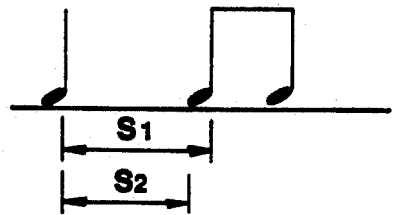
FIG. 12 illustrates a beat setting process.

As shown in FIG. 12, the step time input at keyboard 7 in the note information inputting process and the step time input by the beat key in the beat setting process are, for example, S1, S2, respectively. The step time S2 input by the beat key is a step time in which automatic performance device 1 can accurately determine the note.

If the performer who inputs data on a piece of music for automatic performance sets 48 as the step time of a quarter note, this numeral 48 is a time required for counting 48 clocks (reference clocks) which automatic performance device 1 employs when data on the piece of music for automatic performance is input. Let the period of the reference clock and the number of steps of a quarter note (base time) be tc and St, respectively. In this case, the length of the quarter note becomes St×tc which is a regular length of the piece of music to be automatically performed.

At this time, tempo Ts is expressed as Ts=(the number of quarter notes generated for one second)×60=60×1/(St×tc) because the tempo is expressed as the number of quarter notes which are performed for one minute.

Assume here that a piece of music is input on a real time basis and that tc is not changed. The actual tempo Tr the data of which is input on a real time basis is Tr=60/(S1×tc).

The step time S1 of each note of a piece of music the data of which is input on a real time basis differs slightly in value from one to another around the number of steps St of a set quarter note and hence, there is a case where automatic performance device 1 cannot detect the length of each note input accurately on a real time basis.

By the beat setting, the input piece of music is performed while time is being beaten to the piece o music to correct the beat to a value at which automatic performance device 1 can accurately detect the note length. Since the length of one beat is a quarter note (b=1) in the embodiment, the timing at which a quarter note is generated is beaten at intervals of S2.

On the basis of the interval S2 the data of which is input in the beat setting, CPU 2 corrects the step time and gate time the data of which is input in the real time inputting process are corrected in accordance with equations (2) and (3), and rewrites the values in RAM 3 as step time S and gate time G. Therefore, step time S and gate time G in RAM 3 rewritten in the beat setting are such that automatic performance device 1 can accurately recognize and accurately display a score, as will be described in more detail later.

A display process in which note information stored in RAM 3 is output as a score in a visible state will be described next.

Display is made by depressing a display key at switch unit 8.

Figure 13:
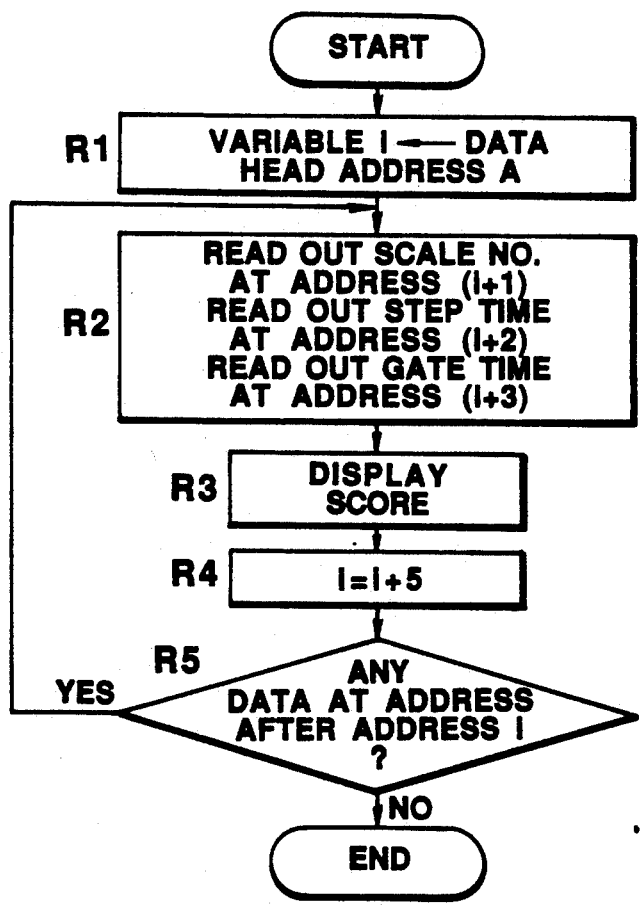
FIG. 13 is a flowchart indicative of a score display process.

As shown in FIG. 13, when the display key is depressed, CPU 2 sets head address A in the note information area as variable i which designates an address in RAM 3 (step R1) and reads out data on the scale number at address (i+1), the step time at address (i+2) and the gate time at address (i +3) (step R2). On the basis of this note information, CPU 2 causes display 5 to display the data on a score using a regular score outputting method (step R3). Then, the CPU sets (i+5) as variable i (step R4) and checks whether there is data at an address after the set address i (step R5). When there is data at an address after address i, the CPU determines that note information which is not indicated as a score remains in RAM 3, and returns to step R2 where it similarly reads out note information from RAM 3 and displays and outputs it as a score (steps R2, R3). At step R5 if there is no longer data at an address after address i, CPU 2 determines that there is no undisplayed note information in RAM 3 to terminate the display of the score.

In this note display process, the score number, step time S and gate time G, and, particularly, step time S and gate time B as the note information stored in RAM 3 are the ones corrected in the beat setting process, as mentioned above. CPU 2 can thus accurately determine the length of each note on the basis of the step time and gate time to thereby accurately display the score of a piece of music to be automatically performed.

Automatic performance will be described next with reference to FIG. 14.

In order to make an automatic performance, the reproduction key of switch unit 8 is depressed.

Figure 14:
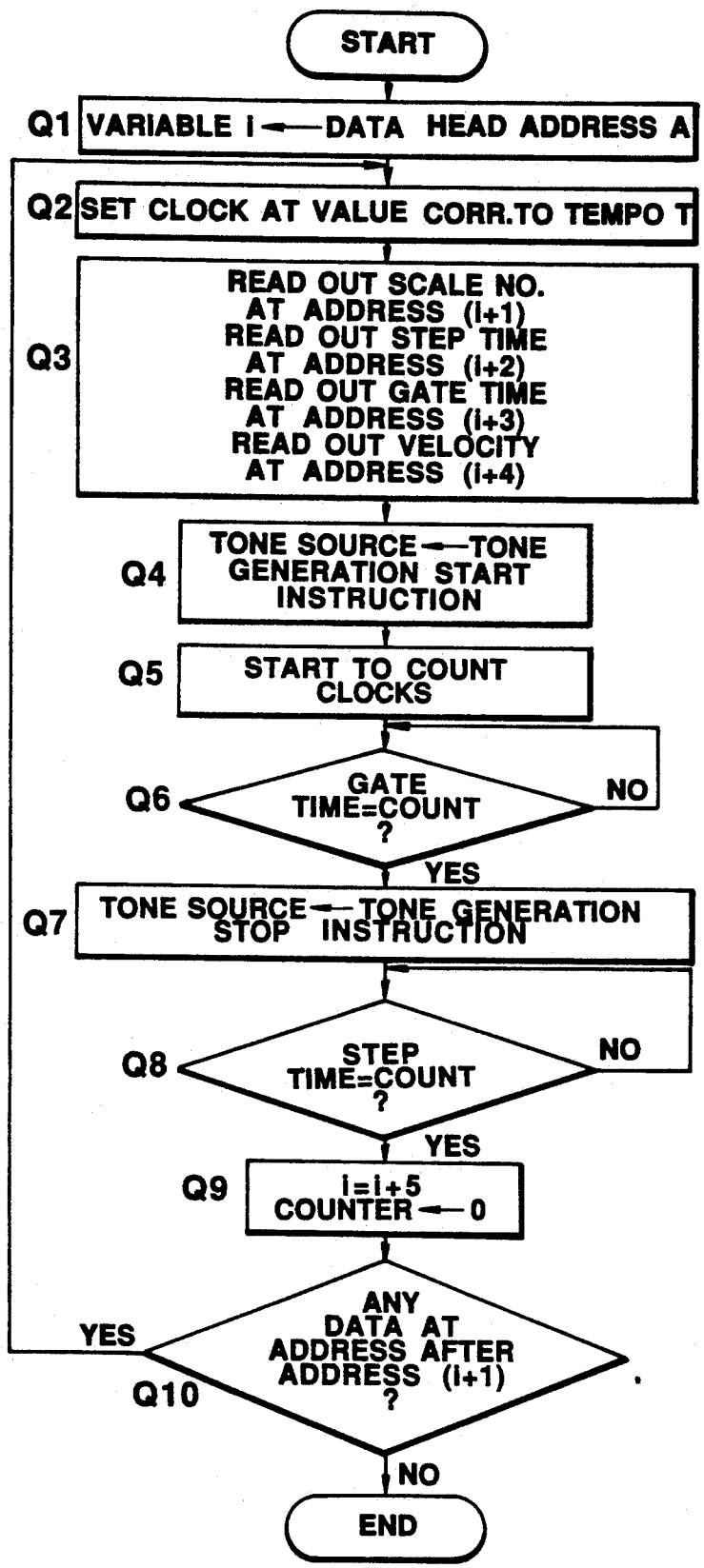
FIG. 14 is a flowchart indicative of an automatic performance process.

As shown in FIG. 14, in response, CPU 2 sets a variable i indicative of the address in RAM 3 at the head address A of the note information area (step Q1), and sets a clock at a value corresponding to tempo T at address i (step Q2). CPU 2 then reads out data on the scale number at address (i+1), step time S at address (i+2), gate time at (address i+3) and a velocity at an address (i+4) (step Q3) and gives tone source circuit 9 an instruction to start tone generation on the basis of the read out note information (step Q4). In response, tone source circuit 9 generates a tone signal for a scale number received and generates the corresponding tone through D/A converter 10 and sounding system 21. Simultaneously with the tone generation, CPU causes the counter to start to count clocks (step Q5), and checks whether the count of clocks has matched with the gate time G (step Q6). The clock used to measure the gate time G or the tone generation time is the clock set as tempo T of the note at step Q2, as mentioned above.

When the count matches with the gate time G, CPU 2 gives tone source circuit 9 an instruction to stop the tone generation (step Q7) to thereby stop further generation of the tone under generation.

CPU 2 then checks whether the counter has counted the step time S (step Q8). If so, CPU 2 determines that the time for the appropriate note length has elapsed, sets at (i+5) variable i which designates an address, and sets the counter at 0 (step Q9). By this processing, the tone generation process for one note is completed. Thus, CPU 2 checks whether there is still data at an address after the address set at step Q9 and checks whether there is another item of ungenerated tone information in RAM 3 (step Q10).

If there is data at an address after address (i+1), the CPU determines that there is ungenerated note information in RAM 3. Thus, it returns to step Q2 and sets the clock at a value corresponding to tempo T at the address set at step Q9. Similarly, CPU 2 causes the counter to count the tone generation time while causing tone generation on the basis of a clock set for each note. When the tone generation ends, CPU 2 causes the counter to count the length of the note, and so on.

As just described above, since the clock having a value corresponding to tempo T set in the beat setting process is employed as a clock which counts the tone generation time and note length of each note, the step time and gate time corrected to the values which the automatic performance device 1 can recognize in the beat setting process are recorrected to the step time and gate time the data of which is input in the real time inputting process for automatic performance.

CPU 2 recorrects the step time and gate time the data of which is input in the real time inputting process in the beat setting process to the step time and gate time which automatic performance device 1 can recognize and stores the resulting data in RAM 3. If CPU 2 intactly reads out data on the thus corrected step time and gate time stored in RAM 3 and performs the piece of music concerned in accordance with reference clock tc, the tempo Tt in automatic performance would be equal to the base time Ts and differ from tempo Tr the data of which is input in the real time inputting process, and performance would fail in musicality, as shown in the following equation:

$$Tt = 60/(St \times tc) = 60/(St \times tc) = Ts \neq Tr$$

In order to equalize tempo Tt in automatic performance to tempo Tr the data of which is input in the real time inputting process, tempo T stored in RAM 3 as the corrected information in the beat setting process is employed as the clock for each performed note.

Let the clock used for automatic performance and the step time corrected in the beat setting process be tc2 and S, respectively. When the following relationship holds, the tempo Tt in automatic performance equals to the tempo Tr input in the real time inputting process to thereby permit performance in the same state as in the real time inputting process:

$$tc2 \times S = tc \times S1$$

It will be seen from the following equation that tempo Tt in automatic performance at this time is equal to tempo Tr in the real time inputting process:

$$Tt = 60/(S \times tc2) = 60/(S \times S1 \times tc/S)$$
$$= 60/(S1 \times tc) = Tr$$

The tc2 used here is tc2=(S1×tc)/2=(S2×tc)/St. If only S2 is known, tc2 can be obtained. In the beat setting process, the CPU calculates T=60b/(S2 ×tc) as tempo T and writes its data for each note in RAM 3.

Therefore, the user can reproduce each note in the state in which its data is input in the real time inputting process while reducing the storage capacity of RAM 3 as note information storage means, thereby making automatic performance natural and rich in musicality. While in the beat setting process in the above embodiment the step time and gate time as note information were rewritten as values suitable for score display from the values input in the real time inputting process, the present invention is not limited to these values. For example, arrangement may be such that a memory area is set which stores only tempo data for each note; the values of the step time and gate time input in the real time inputting process; and the tempo data is calculated and stored in this memory area as the value of data which corrects for each note the step time and gate time the data of which is input in the real time inputting process as a value suitable for score display in the score display process.

While in the score outputting process the CPU outputs a score to display 5 for displaying purposes, it may output it on a sheet of paper or the like.

FIGS. 15–24 show a second embodiment of an automatic performance device according to the present invention.

Elements which are the same as in the first embodiment are identified by the same reference numerals and further description thereof will be omitted.

Figure 15:
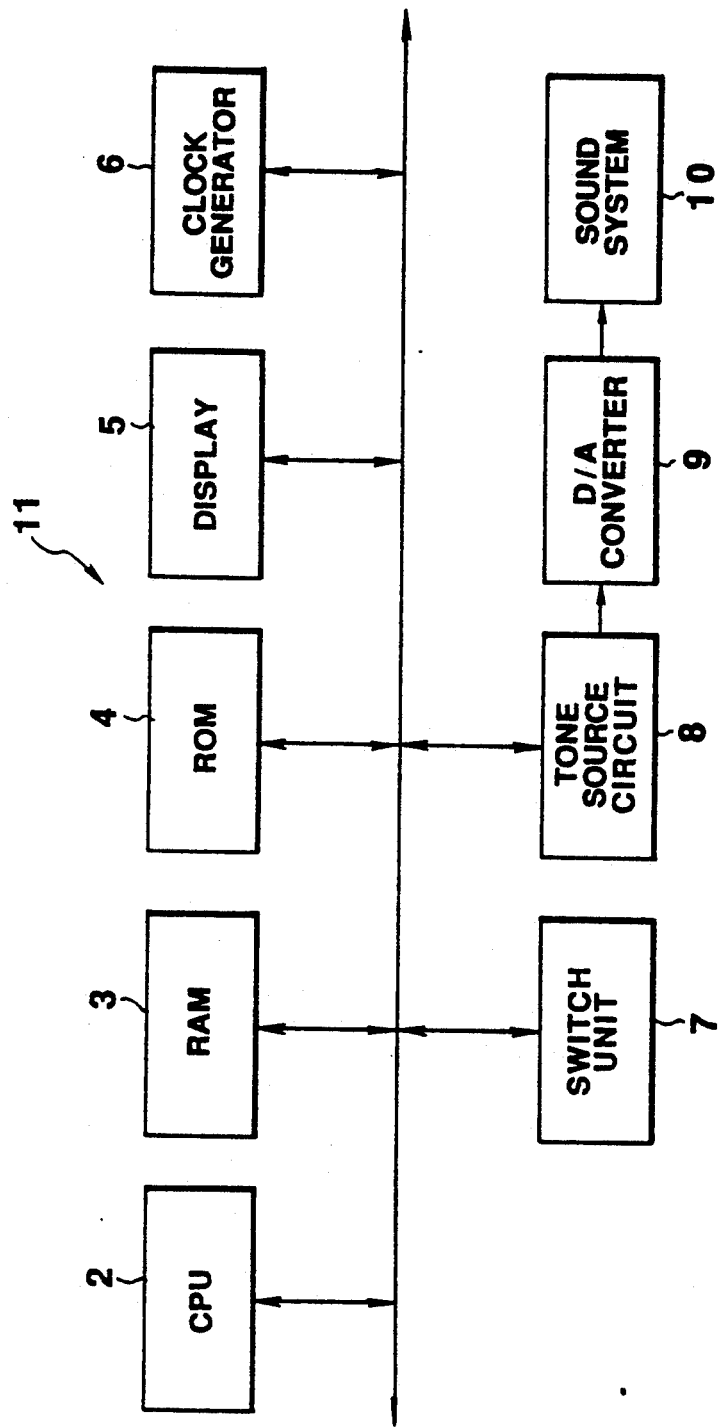
FIG. 15 is a block diagram of an automatic performance device as a second embodiment of the present invention.

FIG. 15 is a block diagram of automatic performance device 20 of the second embodiment. Automatic performance device 20 comprises CPU 2, RAM 3, ROM 4, display 5, clock generator 6, switch unit 27, tone source circuit 9, D/A converter 10 and sound system 21.

Figure 16:
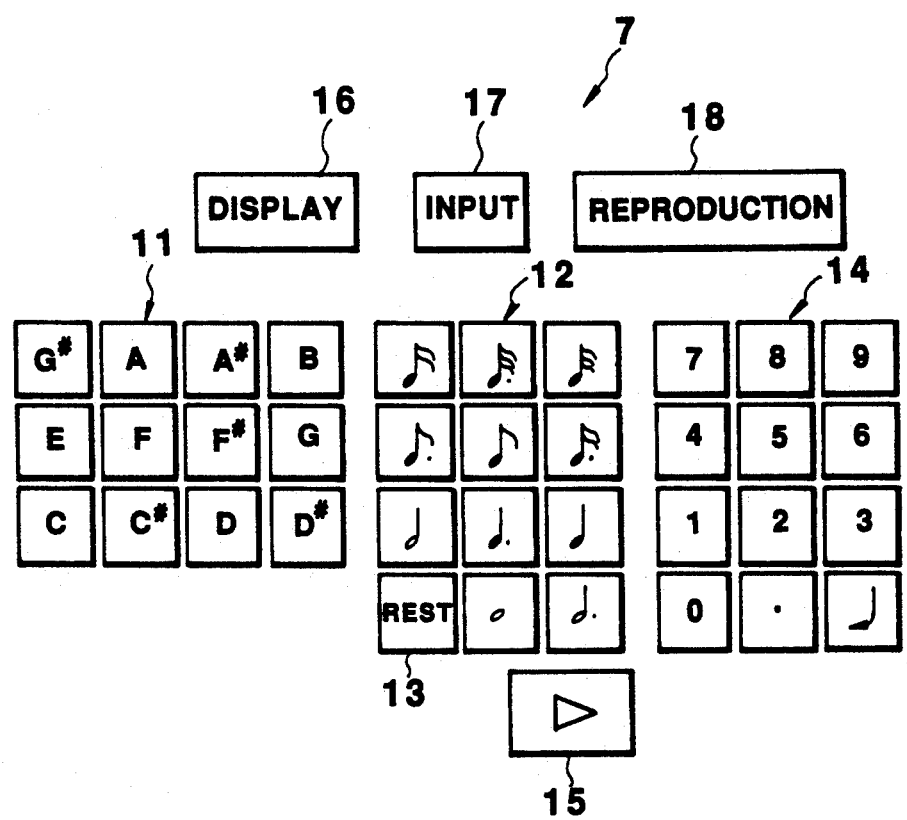
FIG. 16 is a schematic of a display of FIG. 15.

As shown in FIG. 16, switch unit 27 includes note keys 11, note length keys 12, note rest key 13, ten key unit 14, tempo key 15, display key 16, input key 17 and reproduction key 18. One note key 11 is provided for each of kinds of notes and used to input the kind of a note of a piece of music to be performed automatically. One note length key 12 is provided for each note length and is used to designate the note length of a piece of music to be performed automatically. Note rest key 13 is depressed at a position where the rest of a note should occur to thereby add note rest information when note information on a piece of music to be performed automatically is input. For example, note rest key 13 is depressed and a quarter note is then input by note length key 12 to designate a quarter rest. Ten key unit 14 is used to designate a gate time and velocity of a piece of music to be performed automatically. After note information on a piece of music to be automatically performed is input, tempo key 15 is used to designate the timing at which the input note is generated (corresponding to the music speed and tempo). Display key 16 is used to give display 5 an instruction to display the score of a piece of music stored in RAM 3 on display 5. Input key 17 is used to set the operational mode at an input mode when the note information on and tempo of a piece of music to be performed automatically are input. Reproduction key 18 is used to reproduce a piece of music to be performed automatically and stored in RAM 3. Therefore, note keys 11, note length keys 12 and ten key unit 14 constitute note information inputting means while tempo key 15 constitutes timing input means.

In operation, first, inputting information on a piece of music to be performed automatically will be described below.

To this end, input key 17 of switch unit 27 is depressed to set an input mode.

Note information on a piece of music to be performed automatically is input in the order of a note →note length→gate time→velocity using note key 11, note length key 12 and ten key unit 14. The note information is input as shown below, for example, when the note is C4, the note length is a quarter note, the gate time is 45, and the velocity is 64;

C→4→quarter note→4→5→6→4

When inputting data on the note, note length, gate time and velocity is completed in the above process, inputting note information on one tone is completed. By similar processes, items of note information on a piece of music to be performed automatically are sequentially input, and so forth.

Assume now that note information such as is shown in FIG. 4 is input as in the first embodiment. The values of the scale number, step time, gate time and velocity such as are shown in FIG. 5 are thereby determined.

When note information on a piece of music to be performed automatically is input and the respective values concerned are determined, CPU 2 sequentially writes the input items of note information into RAM 3, as shown in FIG. 2.

When all the items of note information on the piece of music to be performed automatically are input and written into RAM 3 in this way, reproduction key 18 is depressed to reproduce the note information while setting the timings at which the respective items of note information are generated using tempo key 15. The value of the tempo set thus is written into a column of tempo T in RAM 3 shown in FIG. 2.

The note information inputting process and the tempo setting process will be described below using a flowchart.

Figure 17:
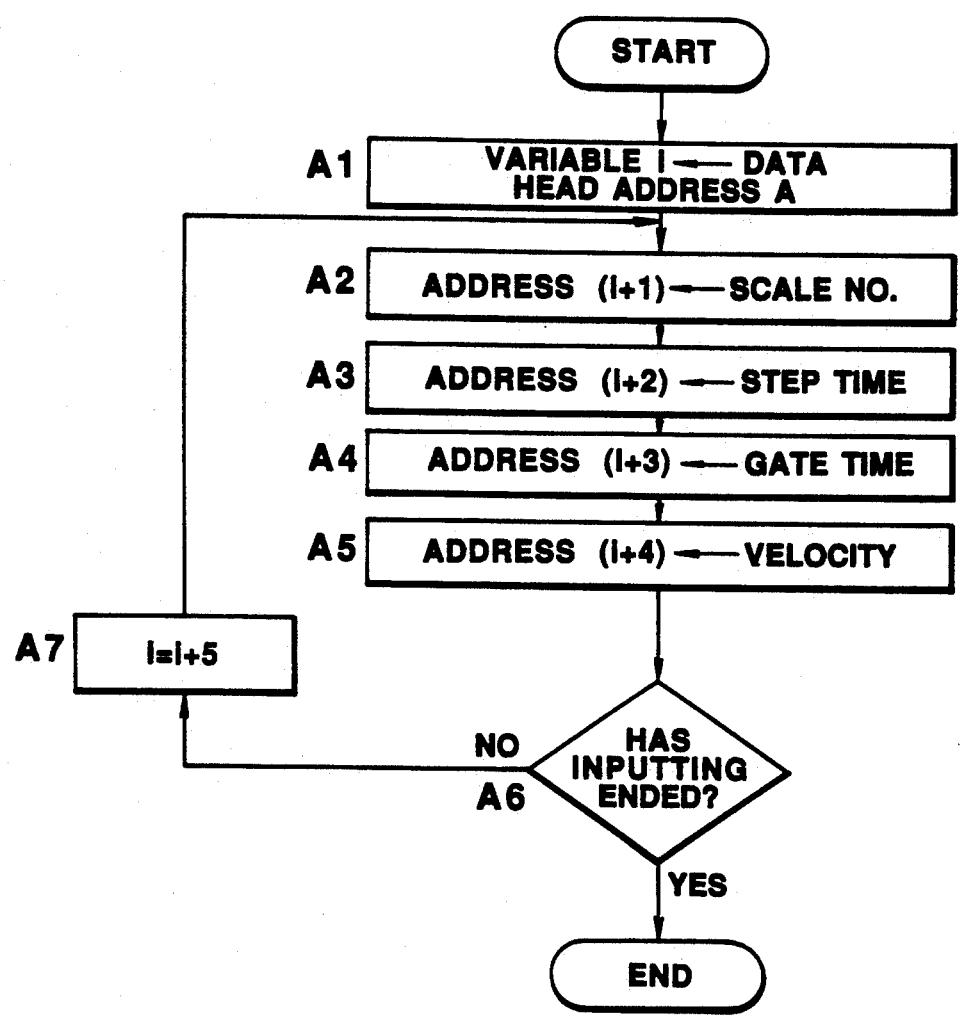
FIG. 17 is a flowchart indicative of a process for inputting a note of a piece of music for automatic performance.

First, as shown in FIG. 17, in the note information inputting process, the CPU sets the head address (data head address) of a note information storage area in RAM 3 at variable i which designates an address in RAM 3 (step A1). The CPU then increments the set address i by one and writes the input scale number (pitch data) there (step A2). The reason why the scale number is stored at address (i+1) incremented by one at step A2 is that tempo data T is stored at head address i in the tempo setting process. The CPU then writes data on a step time corresponding to the note length input by note length key 12 at address (i+2) incremented by one (step A3). It also writes data on the gate time (tone generation time) input by ten key unit 14 at address (i+3) incremented by one (step A4). When data on the velocity (the tone magnitude) is input by ten key unit 14 after data on the gate time is input, the CPU writes the input value of the velocity at address (i+4) incremented by one (step A5). The CPU then checks by detecting the operation of input key 17 whether inputting all the items of note information is completed (step A6).

Unless inputting all the items of note information has not been completed, the CPU increments the address by 5 to obtain address (i+5) to store data on the scale number of the next note therein (step A7). The CPU then returns to step A2 to sequentially write data, starting with the scale number, similarly. The CPU performs the above processing on the sequentially input scale number, note length, tone generation time and velocity to thereby write all the items of note information input for automatic performance into RAM 3. When the CPU detects the termination of the inputting operation at step A6, it ends the processing.

When writing the information into RAM 3 ends, for example, when the respective notes as shown in FIG. 4 are input, the items of note information (see FIG. 5) corresponding to the respective notes; namely, their scale numbers, step times, gate times, velocities, starting with the first tone, are written sequentially at five addresses in RAM 3. That is, the respective items of information on the notes of a piece of music to be performed automatically are input and written into RAM 3 in automatic performance device 1 in what is called the step inputting process. Therefore, correct note information on a piece of music performed automatically is written into RAM 3.

However, data on tempo T is not yet written into RAM 3. Tempo T is then set to perform a process for setting a generation (performance) timing.

Setting the generation timing is performed by depressing reproduction key 18, and depressing tempo key 15 while outputting the note information in the note information inputting process and stored in RAM 3.

Figure 18:
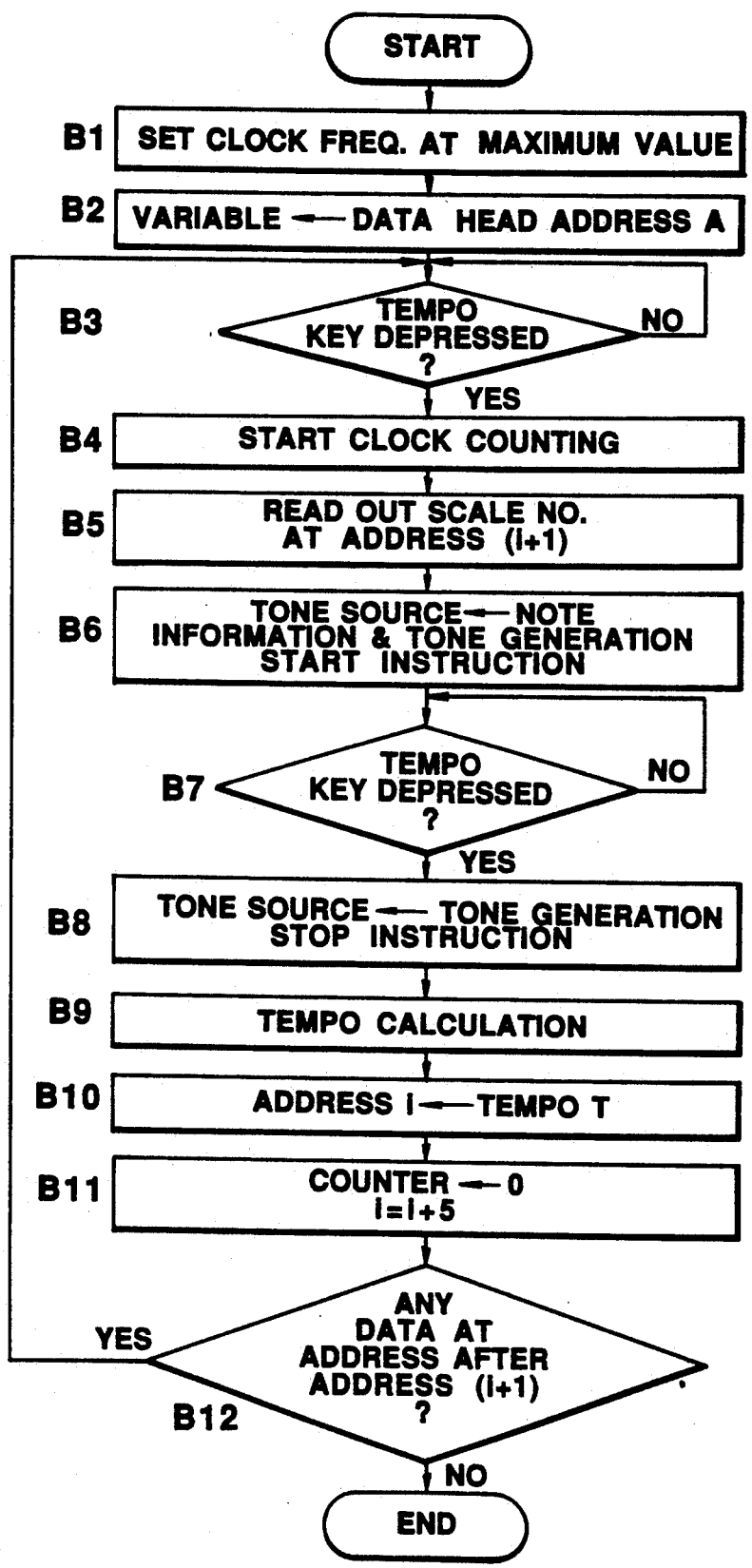
FIG. 18 is a flowchart indicative of a process for setting a tempo of a piece of music for automatic performance.

As shown in FIG. 18, CPU 2 sets a clock having a maximum clock frequency as a tempo detection clock among a plurality of clocks output from clock generator 6 (step B1), and sets variable (pointer) i indicative of an address in RAM 3 at the head address A in the note information area of RAM 3 (step B2). As will be described in more detail later, the clock is used to measure the time interval from the depression of tempo key 15 to its next depression to calculate the tempo of the note on the basis of that measured time interval.

The CPU then checks whether or not tempo key 15 is depressed (step B3). If so, it causes clock counting to start (step B4).

The CPU then reads out the note number at address (i+1) (step B5) and outputs to tone source circuit 8 the note number along with an instruction to start tone generation (step B6). Thus, a tone signal for the appropriate note number is generated from tone source circuit 9 and sounded through D/A converter 10 and sound system 11.

At step B7 the CPU checks whether tempo key 15 is depressed. If so, it gives tone source circuit 9 an instruction to stop the tone generation to thereby stop tone generation (step B8). At this time, the CPU performs the tempo calculation (step B9) and writes data on the calculated tempo T at address i in the not information storage area in RAM 3 (step B10).

Figure 19:
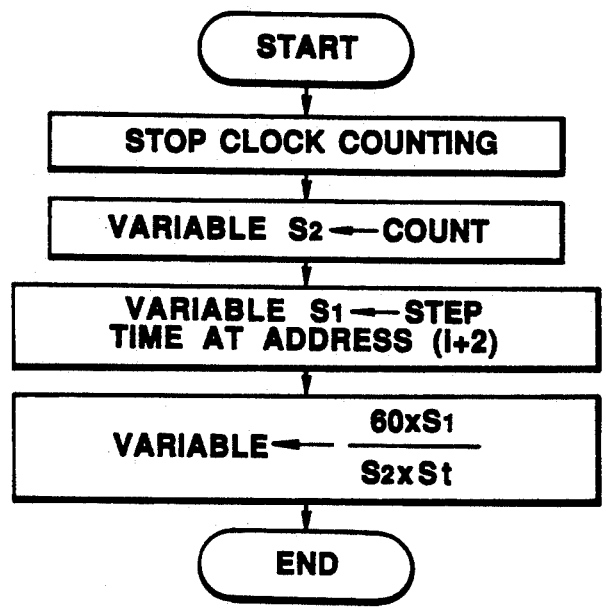
FIG. 19 is a flowchart indicative of tempo calculation in the tempo setting process of FIG. 18.

As shown in FIG. 19, in the tempo calculation, the CPU first stops the clock counting (step C1) and sets the clock count as variable S2 (step C2). The CPU then sets the step time at address (i+2) as variable S1 (step C3) and calculates tempo T in accordance with the next expression (step C4):

$$60 \times S1/S2 \times St = T$$

where St is the base time as a note length which is the base of a piece of music to be performed automatically, and a step time, for example, as a quarter note, is employed.

The tempo calculation expression is set as follows.

Figure 20:
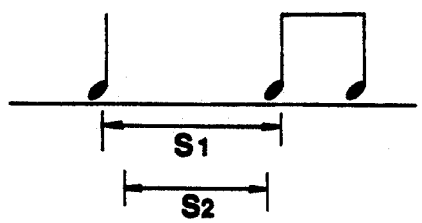
FIG. 20 illustrates the tempo calculation.

As shown in FIG. 20, the respective step times input by note length key 12 and designated by temp key 15 can be set as S1 and variable S2, respectively, which are different from each other. Usually, the tempo is expressed as the number of quarter notes generated per minute. Let the current clock period (second) and the number of clocks which generates the quarter note be tc and St (the number of pulses), respectively. The time required for outputting one quarter note is tc×St. The number of quarter notes counted per second is 1/(tc×St), and the number of quarter notes counted per minute is Tm=60/(tc×St). Therefore, this Tm is standard tempo data. In order to correct this tempo data Tm to tempo data T for automatic performance in accordance with the depression of tempo key 15, standard tempo data Tm is required to be multiplied by S1/S2. As a result, tempo T is T=60×S1/(tc×S2×St). Since clock period tc is constant, the term of clock period tc can be deleted and the expression at step C4 results.

CPU 2 sets thus calculated tempo T as variable T and writes it as tempo T at address i in RAM 3 again in FIG. 18 (step B10).

When the CPU completes calculation of tempo T and storage of data on the tempo into RAM 3, it sets the counter at 0 and sets variable i which designates an address at (i+5) (step B11). The CPU checks whether there is further data or note information written at address (i+1) or at subsequent addresses (step B12). If so, the CPU returns to step S4 to start clock counting. Similarly, the CPU performs tone generation for the next tone. When the CPU detects depression of tempo key 15, it stops generation of the note and calculates tempo T.

When the CPU sequentially performs the same processing for each note and sets the tempos for all the notes, it writes the set values of the tempos T in a column of tempo T in RAM 3 shown in FIG. 2 and terminates the tempo setting.

At this time, setting all the items of data required for automatic performance is completed and automatic performance is possible.

This automatic performance will be described below with reference to FIG. 21.

To this end, reproduction key 18 of switch unit 17 is depressed

Figure 21:
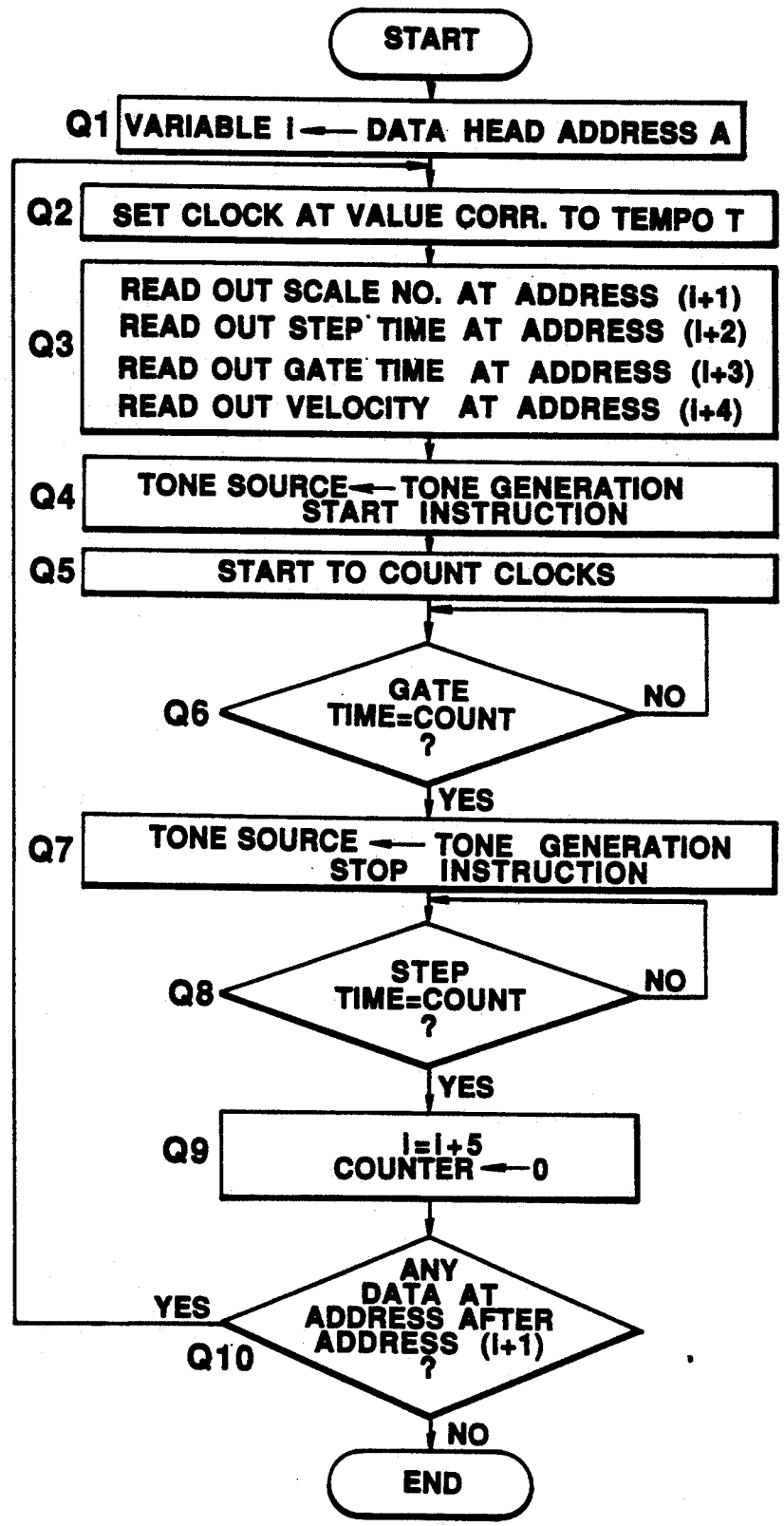
FIG. 21 is a flowchart indicative of automatic performance.
Figure 22:
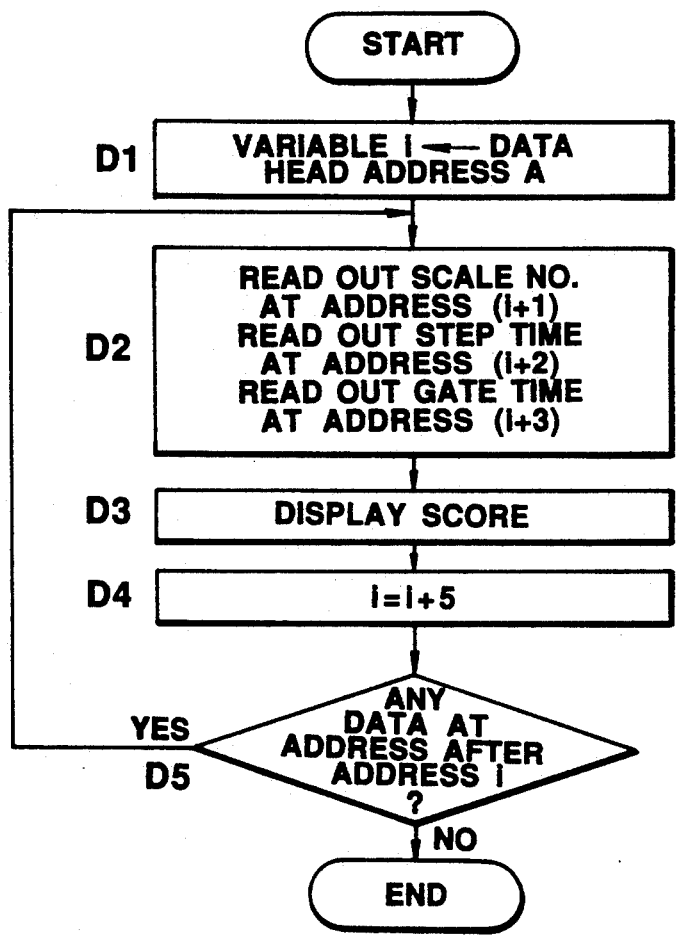
FIG. 22 is a flowchart indicative of a score display.

As shown in FIG. 21, when reproduction key 18 is depressed, CPU 2 sets variable i indicative of an address in RAM 3 at head address A in the note information area (step D1) and sets a clock at a value corresponding to tempo T at address i (step D2). The CPU then reads out the scale number at address (i+1), the step time at address (i+2), the gate time at address (i+3) and the velocity at address (i+4) (step D3), and gives tone source circuit 9 an instruction to start tone generation on the basis of the read-out note information (step D4). When tone source circuit 8 receives this instruction, it generates a tone signal for the scale number received, and generates the appropriate tone through D/A converter 10 and sound system 11. Simultaneously with the generation of this tone, the CPU causes the counter clock to start counting (step D5) and checks whether the count of the clock counter matches the gate time (step D6). As mentioned above, the clock used to measure the tone generation time duration is the clock set as the tempo of the note at step D2.

When the count matches with the gate time, CPU 2 gives tone source circuit 9 an instruction to stop tone generation (step D7) to thereby stop further generation of the tone under generation.

CPU 2 then checks whether the counter has counted the step time (step D8). If so, the CPU determines that the time for the appropriate tone length has elapsed and sets variable i designating an address at (i+5) and the counter at 0 (step D9). By this processing, tone generation for one note is completed. The CPU then checks whether there is further data at an address after the address set at step D9 and whether there is note information not yet generated in RAM 3 (step D10).

When there is further data at an address after address (i+1), the CPU determines that there is note information not yet generated in RAM 3. The CPU then returned to step D2 to set the clock at a value corresponding to tempo T at the address set at step D9. Similarly, the CPU performs tone generation while counting the tone generation time on the basis of the clock set for each note. When tone generation ends, the CPU counts the tone length.

Since a clock which has a value corresponding to the tempo T set in the tempo setting process as the clock which counts the tone generation time duration and note length of each note is employed for that note, as mentioned above, the length of each note can be the one obtained by correcting with a tempo a prescribed note length set by note length key 12 without performing all the notes of a piece of music at one tempo set for the overall piece of music as in the conventional method. Therefore, a tone for each note can be generated by a note length set appropriately by the user and not by the predetermined note length. As a result, a note can be output which is obtained by correcting the generation timing of the note based on accurate note information to thereby provide automatic performance natural and rich in musicality.

A displaying process for outputting the note information stored in RAM 3 as a score in a visible state will be described below.

The displaying process is performed by depressing display key 16 of switch unit 17.

As shown in FIG. 11, when display key 16 is depressed, CPU 2 sets head address A in the note information area as variable i which designates an address in RAM 3 (step D1), and reads out the scale number at address (i+1), the step time at address (i+2) and the gate time at address (i+3) (step D2). On the basis of this note information, the CPU causes display 5 to display a score using a regular score outputting method (step D3). Then, the CPU sets (i+5) as variable i (step D4) and checks whether there is data at an address after the set address i (step D5). If so, the CPU determines that there is note information which is not displayed as a score in RAM 3 and then returns to step D2 where CPU 2 reads out note information from RAM 3 and outputs as a score for displaying purposes (steps D2, D3). When at step D5 there is no data at any address after address i, the CPU determines that there is no undisplayed note information in RAM 3 and terminates the display of the score.

In the score display process the scale number, step time and gate time stored as note information RAM 3 are the data input as step inputs by using the respective appropriate keys of switch unit 17, and are accurate note information, as mentioned above. Therefore, the score of a piece of music to be performed automatically is accurately displayed.

Since in the second embodiment not only the length of each note, but also the generation time duration (gate time) is employed as note information and the generation time duration is corrected on the basis of the tempo concerned, automatic performance more natural and rich in musicality is provided

What is claimed is:

1. An automatic musical performance device comprising:
    note information inputting means, including a performance input device, for inputting to the device a series of items of note information by operating the performance input device, said series of items of note information comprising a piece of music information;
    note information storage means for sequentially storing each respective item of note information input by said note information inputting means;
    beat inputting means for inputting to the device beats of the piece of music information input by said note information inputting means;
    correction means for correcting the note information stored in said note information storage means on the basis of the beat information input by said beat inputting means to produce corrected note information, and for outputting correcting information for converting the corrected note information into uncorrected note information corresponding to the note information originally input by said note information inputting means;
    storage control means for writing the corrected note information produced by said correction means over the note information previously stored in said note information storage means so as to store the corrected note information in said note information storage means, and for storing the correcting information output by said correction means; and
    tone generating means for generating a tone on the basis of the corrected note information and the correcting information stored in said note information storage means.

2. An automatic performance device according to claim 1, wherein said performance input device of said note information inputting means comprises a keyboard.

3. An automatic performance device according to claim 1, wherein said note information inputting means inputs to the device as note information: a scale, note length, gate time as generation time for each note, and velocity data for controlling intensity of tone.

4. An automatic performance device according to claim 3, wherein said correction means corrects the note length of note information stored in said note information storage means on the basis of the beat information input by said beat inputting means.

5. An automatic performance device according to claim 3, wherein said correction means corrects the note length and the gate time of the note information stored in said note information storage means on the basis of the beat information input by said beat inputting means.

6. A score outputting device comprising:
    note information inputting means, including a performance input device, for inputting to the device a series of items of note information by operating the performance input device, said series of items of note information comprising a piece of music information;
    note information storage means for sequentially storing each respective item of note information input by said note information inputting means;
    beat inputting means for inputting to the device beats of the piece of music information input by said note information inputting means;
    correction means for correcting the note information stored in said note information storage means on the basis of the beat information input by said beat inputting means to produce corrected note information, and for outputting correcting information for converting the corrected note information into uncorrected note information corresponding to the note information originally input by said information inputting means;
    storage control means for writing the corrected note information produced by said correction means over the note information previously stored in said note information storage means so as to store the corrected note information in said note information storage means; and
    score outputting means for visually outputting the score information based on the corrected note information stored in said note information storage means.

7. A score outputting device according to claim 6, wherein said performance input device of said note information inputting means comprises a keyboard.

8. A score outputting device according to claim 6, wherein said note information inputting means inputs to the device as note information: a scale, note length, gate time as generation time for each note, and velocity data for controlling intensity of tone.

9. A score outputting device according to claim 8, wherein said correction means corrects the note length of note information stored in said note information storage means on the basis of the beat information input by said beat inputting means.

10. A score outputting device according to claim 8, wherein said correction means corrects the note length and the gate time of the note information stored in said note information storage means on the basis of the beat information input by said beat inputting means.

11. An automatic musical performance device comprising:
    note information inputting means, including a performance input device, for inputting to the device a series of items of note information by operating the performance input device, said series of items of note information comprising a piece of music information;
    note information storage means for sequentially storing each respective item of note information input by said note information inputting means;

beat inputting means for inputting to the device beats of the piece of music information input by said note information inputting means;

correction means for correcting the note information stored in said note information storage means on the basis of the beat information input by said beat inputting means to produce corrected note information, and for outputting correcting information for converting the corrected note information into uncorrected note information corresponding to the note information originally input by said note information inputting means;

storage control means for writing the corrected note information produced by said correction means over the note information previously stored in said note information storage means so as to store the corrected note information in said note information storage means, and for storing the correcting information output by said correction means; and tone generating means for generating a tone on the basis of the corrected note information storage means; and score outputted means for visually outputting score information based on the corrected note information stored in said note information storage means.

12. An automatic performance device according to claim 11, wherein said performance input device of said note information inputting means comprises a keyboard.

13. An automatic performance device according to claim 11, wherein said note information inputting means inputs to the device as note information: a scale, note length, gate time as generation time for each note, and velocity data for controlling intensity of tone.

14. An automatic performance device according to claim 11, wherein said correction means corrects the note length of note information stored in said note information storage means on the basis of the beat information input by said beat inputting means.

15. An automatic performance device according to claim 13, wherein said correction means corrects the note length and the gate time of the note information stored in said note information storage means on the basis of the beat information input by said beat inputting means.

16. An automatic performance device comprising:

note information inputting means for selecting and inputting to the device a series of items of note information from a plurality of pre-prepared item of note information, said series of items of note information comprising a piece of music information;

note information storage means for sequentially storing each respective item of note information input by said note information inputting means;

timing inputting means for inputting to the device generation timings for the respective items of note information input by said note information inputting means;

timing information storage means for storing the generation timings input by said timing inputting means in correspondence with the respective items of note information stored in said note information storage means;

correction means for correcting the note information stored in said note information storage means on the basis of the timing information stored in said timing information storage means; and tone generation means for generating a tone on the basis of the note information corrected by said correction means.

17. An automatic performance device according to claim 16, wherein said note information inputting means inputs scale information and note length information separately as note information.

18. An automatic performance device according to claim 16, wherein said note information inputting means inputs to the device as note information: a scale, note length, gate time as generation time for each note, and velocity data for controlling intensity of tone.

19. An automatic performance device according to claim 17, wherein said correction means corrects the note length of note information stored in said note information storage means on the basis of the timing information input by said timing information storage means.

20. An automatic performance device according to claim 18, wherein said correction means corrects the note length and the gate time of the note information stored in said note information storage means on the basis of the timing information stored in said timing information storage means.

21. An automatic performance device according to claim 19, wherein said timing information storage means stores the timing information input by said timing inputting means as generation timing information which controls the timing of clock generation for measuring the length of each note stored in said note information storage means, in correspondence with an interval between timings at which said timing inputting means is operated.

22. An automatic performance device comprising:

note information inputting means for selecting and inputting to the device a series of items of note information from a plurality of pre-prepared items of note information, said series of items of note information comprising a piece of music information;

note information storage means for sequentially storing each respective item of note information input by said note information inputting means;

timing inputting means for inputting to the device generation timings for the respective items of note information input by said note information inputting means;

timing information storage means for storing the generation timings input by said timing inputting means in correspondence with the respective items of note information stored in said note information storage means;

correction means for correcting the note information stored in said note information storage means on the basis of the timing information stored in said timing information storage means; and tone generation means for generating a tone on the basis of the note information corrected by said correction means; and score outputted means for visually outputting score information based on the note information stored in said note information storage means.

23. An automatic performance device according to claim 22, wherein said note information inputting means inputs scale information and note length information separately as note information.

24. An automatic performance device according to claim 22, wherein said note information inputting means outputs to the device as note information: a scale, note length, gate time as generation time for each note, and velocity data for controlling intensity of tone.

25. An automatic performance device according to claim 23, wherein said correction means corrects the note length of note information stored in said note information storage means on the basis of the timing information input by said timing information storage means.

26. An automatic performance device according to claim 24, wherein said correction means corrects the note length and the gate time of the note information stored in said note information storage means on the basis of the timing information stored in said timing information storage means.

27. An automatic performance device according to claim 25, wherein said timing information storage means stores the timing information input by said timing inputting means as generation timing information which controls the timing of clock generation for measuring the length of each note stored in said note information storage means, in correspondence with an interval between timings at which said timing inputting means is operated.

28. An automatic musical performance device comprising note information inputting means, including a performance input device, for inputting to the device a series of items of note information by operating the performance input device, said series of items of note information comprising a piece of music information;

note information storage means for sequentially storing each respective item of note information input by said note information inputting means;

beat inputting means for inputting to the device beats of the piece of music information input by said note information inputting means;

correction means for correcting the note information stored in said note information storage means on the basis of the beat information input by said beat inputting means to produce corrected note information, and for outputting correcting information for converting the corrected note information into uncorrected note information corresponding to the note information originally input by said note information inputting means; and storage control means for writing the corrected note information produced by said correction means over the note information previously stored in said note information storage means so as to store the corrected note information in said note information storage means, and for storing the correcting information output by said correction means.

29. An automatic performance device comprising:

note information inputting means for selecting and inputting to the device a series of items of note information from a plurality of pre-prepared items of note information said series of items of note information comprising a piece of music information;

note information storage means for sequentially storing each respective item of noteinformtion input by said note information inputting means;

timing inputting means for inputting to the device generation timings for the respective items of note information input by said note information inputting means;

timing information storage means for storing the generation timings input by said timing inputting means in correspondence with the respective items of note information stored in said note information storage means; and correction mean for correcting the note information stored in said note information storage means on the basis of the timing information stored in said timing information storage means.

* * * * *

UNITED STATES PATENT AND TRADEMARK OFFICE
CERTIFICATE OF CORRECTION

PATENT NO. : 5,254,803
DATED : October 19, 1993
INVENTOR(S) : Ken Terao

It is certified that error appears in the above-indentified patent and that said Letters Patent is hereby corrected as shown below:

```
Title page, Item [56] References Cited,
        under "U.S. PATENT DOCUMENTS, insert:

--4,646,609   3/1987   Teruo et al
  4,417,494  11/1983   Nakada et al
  3,955,459   5/1976   Mochida et al
  4,491,049   1/1985   Mizuta et al--

Column 22, last line (claim 24), change: "outputs" to --inputs--
```

Signed and Sealed this

Nineteenth Day of September, 1995

Attest:

BRUCE LEHMAN

*Attesting Officer*  *Commissioner of Patents and Trademarks*